United States Patent [19]

Muramoto et al.

[11] Patent Number: 4,477,414

[45] Date of Patent: Oct. 16, 1984

[54] EVAPORATIVE CONTAINER

[75] Inventors: Takayoshi Muramoto; Shingi Nishino; Toshiyuki Sasaki; Takanori Sasaki, all of Hiroshima, Japan

[73] Assignee: Fumakilla Limited, Tokyo, Japan

[21] Appl. No.: 378,237

[22] Filed: May 14, 1982

[30] Foreign Application Priority Data

May 20, 1981 [JP] Japan .................................. 56-74830
May 20, 1981 [JP] Japan .................................. 56-71915[U]
May 20, 1981 [JP] Japan .................................. 56-71916[U]

[51] Int. Cl.$^3$ .......................... A61L 9/02; A61L 9/04
[52] U.S. Cl. .................................. 422/125; 122/366; 239/42; 239/43; 239/44; 239/57; 239/59; 261/95; 261/97; 422/123
[58] Field of Search ................ 422/5, 123, 125, 4, 422/306; 261/95, 97; 159/5, 34, 35, 38; 239/34, 43, 44, 41, 42, 45, 49, 50, 56, 57, 59; 122/366; 43/129

[56] References Cited

U.S. PATENT DOCUMENTS 876,904   1/1908  Goodhue et al. .................. 239/42
1,377,909  5/1921  Movlin ............................... 239/45

Primary Examiner—Barry Richman
Assistant Examiner—William R. Johnson
Attorney, Agent, or Firm—Browdy and Neimark

[57] ABSTRACT

An apparatus for evaporating a solution in constant proportions of the ingredients, including:
(a) a solution container having a neck that extends upward from the center;
(b) an impregnation member to be impregnated with the solution which is made of a water-absorbing material;
(c) an impregnation member support;
(d) a cylindrical tubular member that is fitted over a cylindrical tube that projects upward from the center of said support to thereby define an enclosed space;
(e) a feed pipe inserted through the hole made in the center of said support, the lower part of said pipe being immersed in the solution in the container and the upper part thereof being within said cylindrical tubular member; and
(f) a hole or slit made in the container and the impregnation support member so as to provide a passage that communicates the atmosphere with the space formed in the container by mounting the impregnation member support on the container,
the impregnation member support being in the form of a supporting plate from the center of which extends upward a tubular member over which said cylindrical tubular member is fitted and which has one or more holes or clearances, a projection extending downward from the center of said supporting plate, said projection being shaped to fit over the neck of the container, a hole being made in the center of said supporting plate through which the feed pipe is inserted.

22 Claims, 25 Drawing Figures

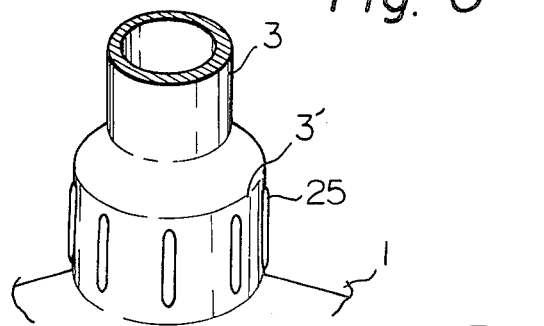
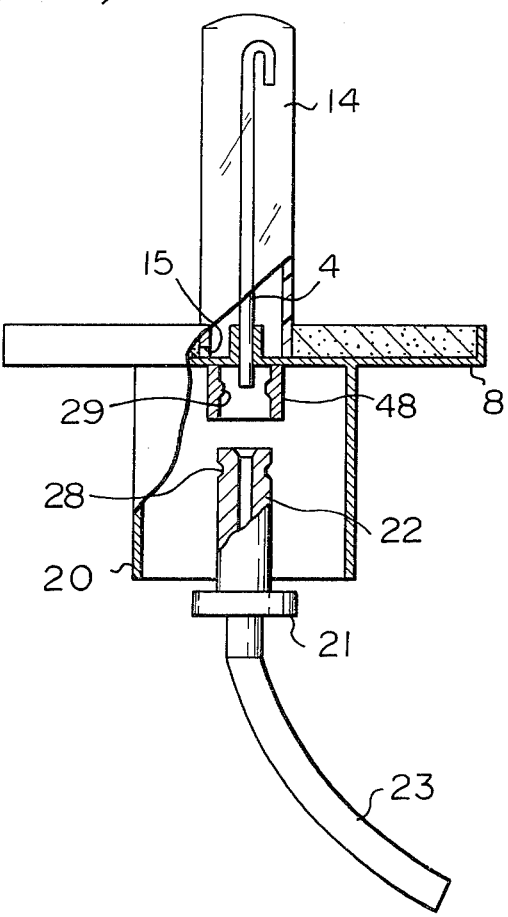

EVAPORATIVE CONTAINER

BRIEF SUMMARY OF THE INVENTION

The present invention relates to a container for solutions of evaporative perfumes, insecticides, bactericides, mold inhibitors, etc.

Evaporative containers are known, and Japanese Utility Model Disclosures Nos. 10700/80, 104435/80, 10699/80, 122736/80, etc. describe evaporative containers which let the perfume solution evaporate from the exposed end of a wick immersed directly in the container. Japanese Utility Model Disclosures Nos. 119846/79 and 120246/78 describe evaporative containers wherein a disc made of a water-absorbing material is placed in contact with the exposed end of the wick and it is impregnated with the perfume solution for evaporation into air.

In either type of the container, the wick is directly immersed in the perfume solution in the container, so the most volatile perfume component evaporates first, and the smell of the perfume becomes very weak in one or two weeks, and cannot be maintained for a longer period.

Utility Model Disclosure No. 59638/80 describes an evaporative container comprising a soft container body, a small tube immersed in the perfume solution in the container body, a spray nozzle fitted to the exposed end of the tube and absorbent cotton surrounding the nozzle. By pressing the soft container, the perfume solution is sprayed on the absorbent cotton through which it is evaporated into air. Japanese Utility Model Disclosure No. 70962/73 discloses a deodorizing device comprising an elastic container holding a perfume solution connected by a tube to a perfumer incorporating a moisture absorbent. By pressing the elastic container, the perfume solution is fed to the absorbent through which it is evaporated into air to mask any undesired smell.

The evaporative containers described in these two utility model applications supply the perfume solution into the moisture absorbent by pressing the elastic container holding the perfume solution, so they are effective for temporary evaporative purposes, but they are not capable of or intended for achieving consistent evaporation of a given amount of the perfume solution.

The present invention has been accomplished to eliminate the defects of the conventional evaporative containers and one object of the invention is to provide an evaporative container capable of supplying consistently an unchanged formulation of perfume solution, insecticidal solution, bactericidal solution, mold inhibiting solution, etc.

This object of the invention can be achieved by an evaporative container which comprises a container for holding the perfume solution, insecticidal solution, etc. and an impregnation element made of a water-absorbing material that is fitted to the head of the container and which is supplied with the liquid contents through a small tube using the mechanism of a siphon.

BRIEF DESCRIPTION OF THE DRAWINGS

FIG. 6 is a perspective view of the impregnation member support 8 shown in FIG. 5;

FIG. 7 shows how the impregnation member support 8 of FIG. 5 is fitted to a packing support axis;

DETAILED DESCRIPTION OF THE INVENTION

Figure 1:
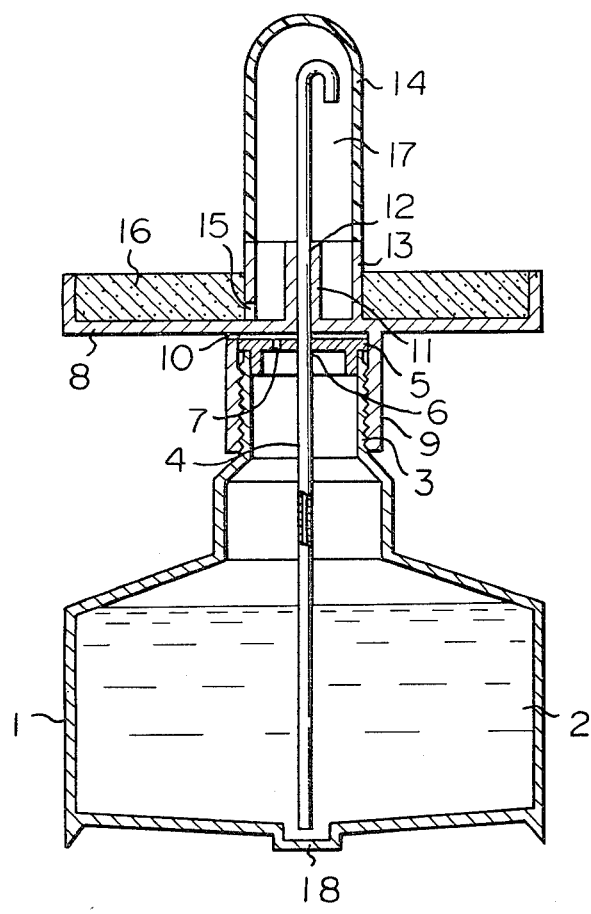
FIG. 1 shows one embodiment of the evaporative container of the present invention.

In FIG. 1, the numeral 1 indicates a container for holding a perfume solution, insecticidal solution, etc. 2. A projecting mouth 3 is fitted to the top of the container and a thread is cut in the outer surface of the mouth 3. The top end of the opening of the mouth 3 is fitted with a cap 5 having a center hole 6 through which a capillary feed tube 4 is inserted and an air vent 7 bored at a selected point. The air vent 7 is necessary for making the pressure in the container 1 equal to atmospheric, but if it is too large, the solution 2 may leak when the container falls down, and if not, too much solution evaporates through the air vent 7, or the most volatile component evaporates first, and if the solution to be evaporated is a perfume solution, the fragrance becomes weak.

Figure 21:
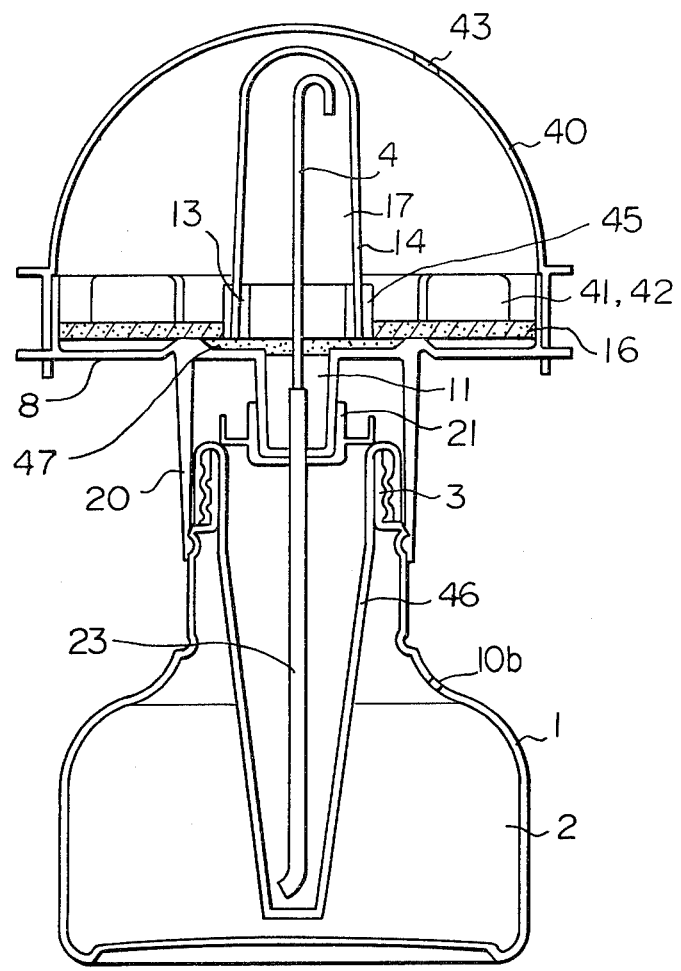
FIG. 21 is a sectional view of a hermetically sealed evaporative container holding the perfume solution, insecticidal solution, etc. according to the present invention.

The numeral 8 indicates an impregnation member support from the bottom of which extends a lower annular member 9 having a female thread that engages the thread made around the projecting mouth 3. A vacuum-breaking air passage hole 10 that communicates the air in the container 1 with the atmosphere via the vent 7 in the cap 5 is made in the annular member 9 in the area where it is connected to the impregnation member support 8. A supporting tube 11 having a central hole 12 through which the feed pipe 4 is inserted extends upward from the center of the impregnation member support 8, and an upper tubular member 13 surrounding said support tube 11 also extends upward from the support 8, and a length of a cylindrical tubular member 14 made of an elastic material such as a soft synthetic resin is fixed to the top end of the tubular member 13 to form a cylindrical chamber 17. A small hole 15 for passage of the solution 2 is made in the upper tubular member 13 in a selected area where it is connected to the impregnation member support 8. The impregnation member support 8, lower annular member 9, supporting tube 11 and upper tubular member 13 are formed integrally. The cylindrical member 14 may be directly fixed to the impregnation member support 8, or fitted over the tubular member 13 as shown in FIG. 21.

The numeral 16 indicates an annular impregnation member and is fitted on the support 8 in the area defined by its outer wall and the upper tubular member 13 so that the small hole 15 is closed by it. The member 16 is made of a water-absorbing material such as filter paper, natural fibers or synthetic fibers.

The feed pipe 4 of a predetermined length has a U-shaped or straight top end. The feed pipe is inserted through a center hole 12 in the support tube 11 in such a manner that its top end is positioned within the cylindrical chamber 17 and that it extends a given distance below the support 8. The feed pipe 4 is made of glass, hard or soft synthetic resin, or metal.

The support 8 having the feed pipe 4 inserted through the support tube 11 and the impregnation member 16 fitted thereto is brought into engagement with the projecting mouth 3 of the container by means of the lower annular member 9 which is threaded over the mouth 3. One end of the feed pipe 4 extends through the hole 6 in the cap 5 fitted in the projecting mouth 3 until it is immersed in the solution 2.

When the elastic cylindrical member 14 is pressed with fingers and the fingers are removed, the pressure in the cylindrical chamber 17 becomes lower than one atmosphere since the small hole 15 remains closed by the impregnation member 16. The solution 2 in the container 1 is lifted by vacuum through the feed pipe 4 and drips through the U-shaped or straight top end. The drops of the solution are absorbed by the impregnation member 16 and form a liquid film that closes the small hole 15. The solution then evaporates from the impregnation member 16 and at the same time, it is gradually absorbed by the member 16. In this manner, while the pressure in the cylindrical chamber 17 is kept slightly lower than one atmosphere, the solution 2 is automatically lifted, dripped and absorbed by the impregnation member 16 as through a siphon, and eventually, the solution 2 evaporates into the atmosphere as it spreads throughout the impregnation member 16. The amount of evaporation of the solution can be controlled by the exposed area of the impregnation member 16. If the inside diameter of the feed pipe 4 is too large, the siphon mechanism may not work effectively because of inefficient capillary action and insufficient reduction in the pressure in the cylindrical chamber 17.

If the cylindrical member 14 is made of a transparent material, the user can enjoy observing the solution drip. To ensure complete consumption of the solution, the feed pipe 4 should be positioned the closest to the lowest part of the bottom of the container. A more effective way is to provide a bottom in the form of an inverted cove and position the end of the feed pipe 4 to face the lowest central part of the bottom, or a cavity 18 may be made in the center.

The tubular member 13 that extends upward from the center of the support 8 may be provided with a plurality of holes rather than one hole, and the hole(s) may be in the form of a slit. To achieve smooth travelling of the solution 2 toward the impregnation member 16, a water-absorbing member other than the impregnation member 16 may be fitted through or over the small hole 15. By this arrangement, a series of phenomena including the lifting of the solution 2 through the cylindrical chamber 17, as well as subsequent dripping of the solution, its absorption by the impregnation member 16 and evaporation into the atmosphere can take place at the right time.

Figure 2:
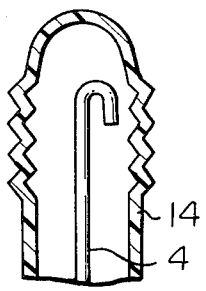
FIGS. 2, 3 and 4 show other embodiments of the cylindrical element 14 of FIG. 1.
Figure 3:
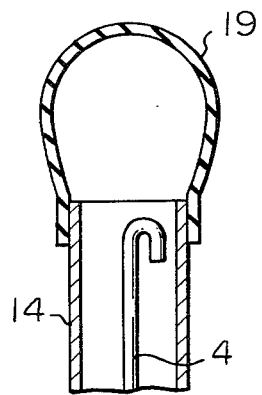
Figure 4:
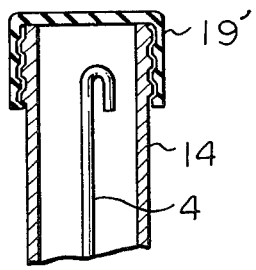

FIG. 2 shows another embodiment of the elastic cylindrical member 14 wherein its head portion is provided with pleats, and FIG. 3 shows still another embodiment wherein an elastic bulb 19 made of, say, rubber is fixedly attached to the head of the cylindrical member 14 when it is made of glass or hard synthetic resin. These modified cylindrical members 14 are very easy to press with fingers. FIG. 4 shows yet another embodiment wherein the top of the cylindrical member 14 made of a hard material is provided with a detachable and hermetically sealable cap 19'. In this embodiment, when the cap is closed after filling up the cylindrical member 14 with the solution 2, the pressure in the cylindrical chamber 17 becomes lower than one atmosphere as the solution permeates through the impregnation member 16, and the solution can be lifted automatically without pressing the head of the cylindrical member 14 with fingers several times.

Figure 5:
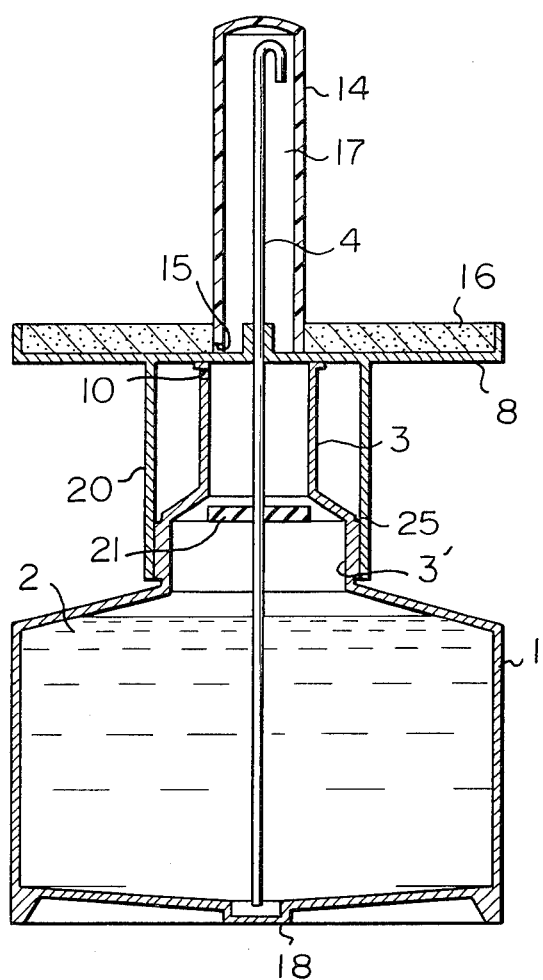
FIG. 5 shows a second embodiment of the evaporative container of the present invention.

FIG. 5 shows a second embodiment the evaporative container of the present invention, wherein a packing 21 is fitted to the feed pipe 4 inserted through the impregnation member support 8 in such a manner that the distance between the packing 21 and the support 8 is slightly longer than the height of the projecting mouth 3. In this embodiment, the level of the solution 2 is kept below the packing 21 as the support 8 remains in intimate contact with the container 1, and at the same time, the lower end of the feed pipe 4 extends to the interior of a cavity 18 made in the center of the bottom of the container 1. The support 8 has an integral outer tube 20 that is slipped over a neck 3' and engages therewith by means of ridges 25 as shown in FIG. 6. The upper end of the projecting mouth 3 has air holes 10. In the embodiment of FIG. 5, when the container 1 is pushed into the outer tube 20 of the support 8, the packing 21 fitted to the feed pipe 4 moves downward as it slides against the inner wall of the projecting mouth 3 to reduce the space of the interior of the container 1, and when the support 8 is completely joined to the container 1, the interior of the container communicates with the atmosphere. Therefore, by the same mechanism described in connection with FIG. 1, the lifting, dripping, permeation through the impregnation member 16 and evaporation of the solution are effected continuously. Also, in the embodiment of FIG. 5, the cylindrical member 14 of FIG. 1 comprises a single integral cylindrical tubular member 14, without the tubular member 13 portion.

In the embodiment shown in FIG. 7, a packing supporting axis 22 having an inside diameter corresponding to the outside diameter of the feed pipe 4 has an engagement groove 28 formed around one end of the axis, and an inner tube 48 fixed to the underside of the center of the support 8 has an inside diameter corresponding to the outside diameter of the axis 22, and an engagement ridge 29 that corresponds to the engagement groove 28 is formed in a selected area of the inner wall of the inner tube 19. The advantage of this arrangement is that the packing support axis 22 can be attached to the support 8 simply by pressing the axis 22 into the tube 48 to bring the groove 28 into engagement with the ridge 29. This detachability of the axis 22 from the support 8 makes the assemblying of the respective components of the container very easy. The engagement groove and ridge may be replaced by other designs, for example, a thread is cut in the outer periphery of the packing support axis and a corresponding groove is cut in the inner periphery of the inner tube 48.

Figure 8:
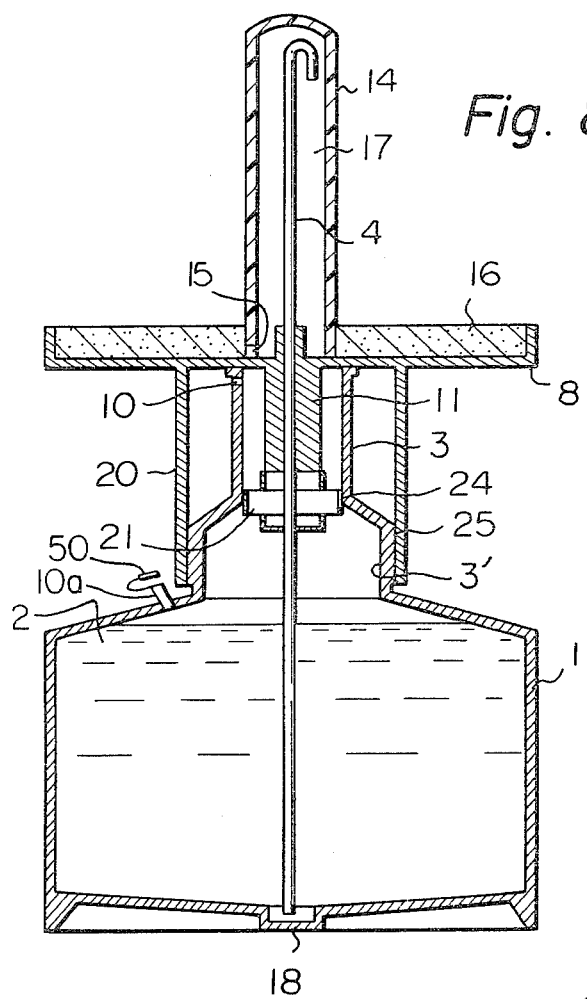
FIGS. 8 and 9 show packings different from those shown in FIGS. 5 to 7 and how they are fixed in position.
Figure 9:
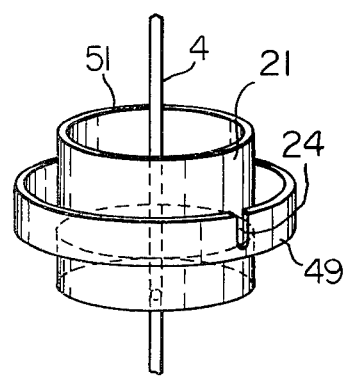

In FIGS. 8 and 9, the support tube 11 for supporting the feed pipe 4 extends downward from the center of the support 8 and the feed pipe 4 with a packing 21 fitted thereto is inserted through the support tube 11 from below until the packing is brought into intimate contact with the projecting mouth 3. In this embodiment, the packing 21 consists of an outer tube 49 and an inner tube 51 (FIG. 9). The outside diameter of the outer tube 49 is equal to the inside diameter of the projecting mouth 3, and the inside diameter of the inner tube 51 is equal to the outside diameter of the support tube 11, and the outer tube 49 is provided with one slit 24. When the container is pressed into the outer tube 20 of the support 8, the outer tube 49 of the packing 21 moves downward as it slides against the inner wall of the projecting mouth 3, with the inner tube 51 of the packing 21 remaining in intimate contact with the bottom of the supporting tube 11, and in consequence, the space of the interior of the container 1 is reduced as in the embodiment of FIG. 5. The difference is that even when the packing reaches its lowest point, the greater part of the outer tube 49 of the packing 21 remains in contact with the inner wall of the projecting mouth 3 and it is only part of the slit 24 that provides a passage of communication between the interior of the container 1 and the atmosphere. This passage of communication between the interior of the container and the atmosphere is not as large as in the embodiment of FIG. 5, so the chance of the solution 2 to leak out when the container accidentally falls down is minimum.

Figure 10:
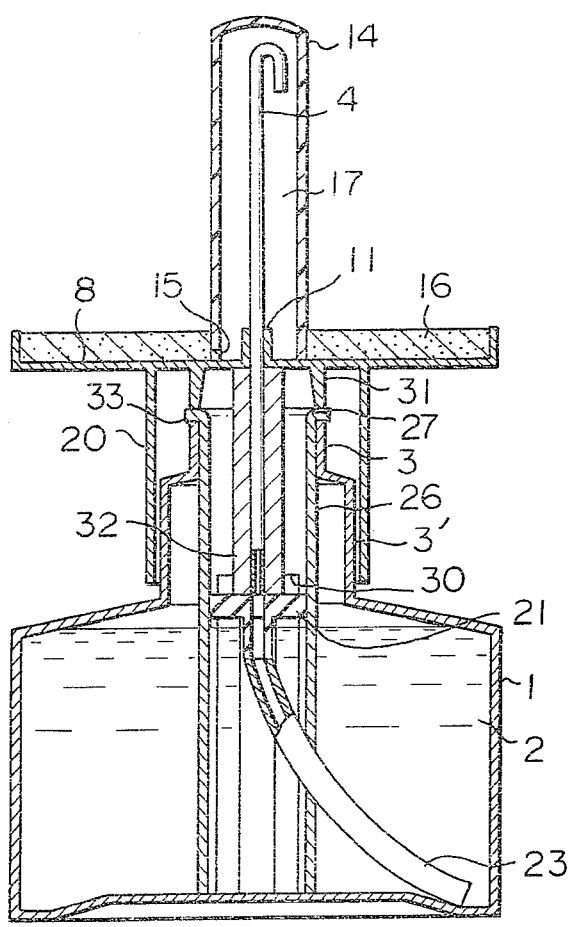
FIG. 10 shows a third embodiment of the evaporative container of the present invention.
Figure 11:
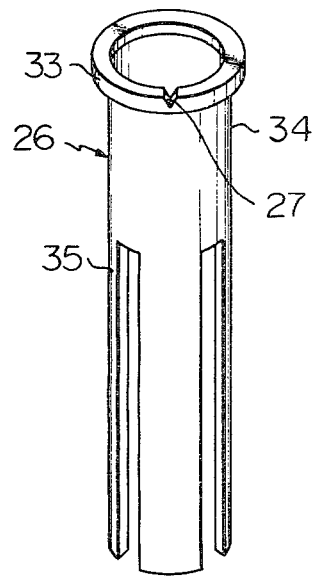
FIG. 11 is a perspective view of cylindrical holder 26 shown in FIG. 10.
Figure 12:
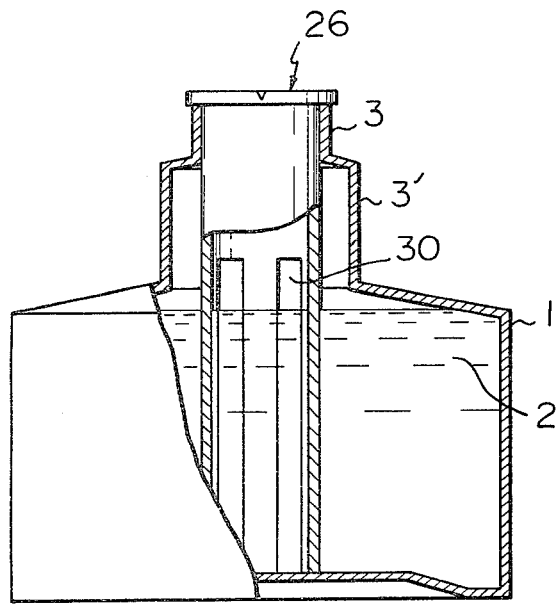
FIG. 12 shows how cylindrical holder 26 of FIG. 11 is fixed in position.
Figure 13:
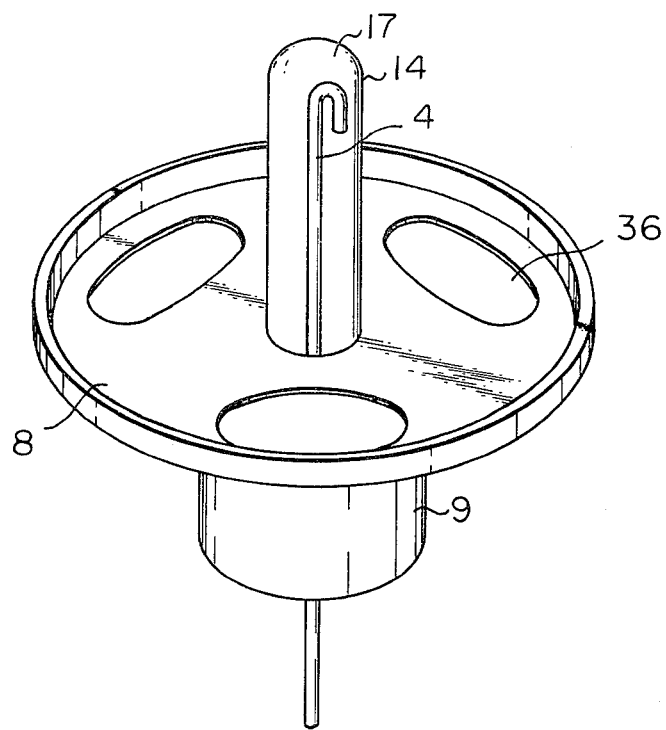
FIG. 13 shows another embodiment of the impregnation member support 8.
Figure 14:
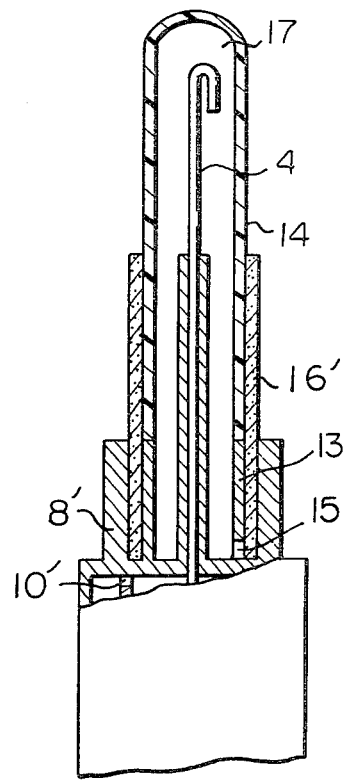
FIG. 14 shows another construction of the impregnation member support with impregnation member fitted thereto.
Figure 15:
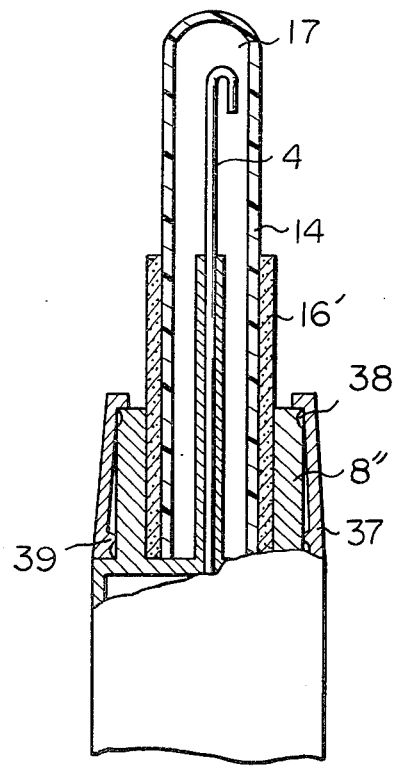
FIG. 15 shows an evaporation control device attached to the container shown in FIG. 14.
Figure 16:
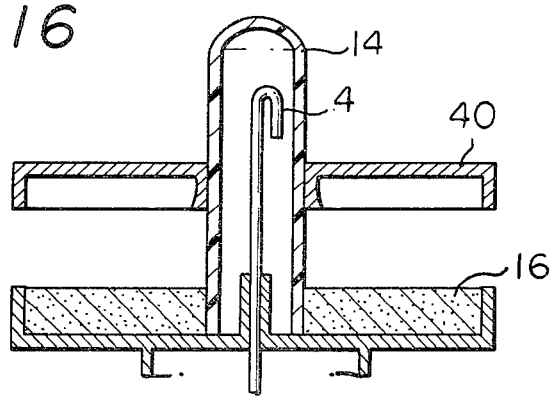
FIG. 16 shows one embodiment of the evaporation control lid used in the evaporative container of the present invention.
Figure 17:
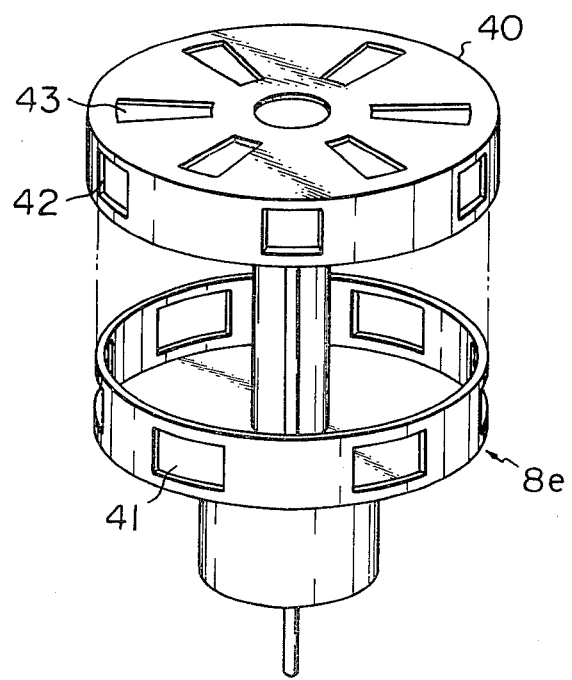
FIG. 17 is another embodiment of the evaporation control lid used in the evaporation container of the present invention.
Figure 18:
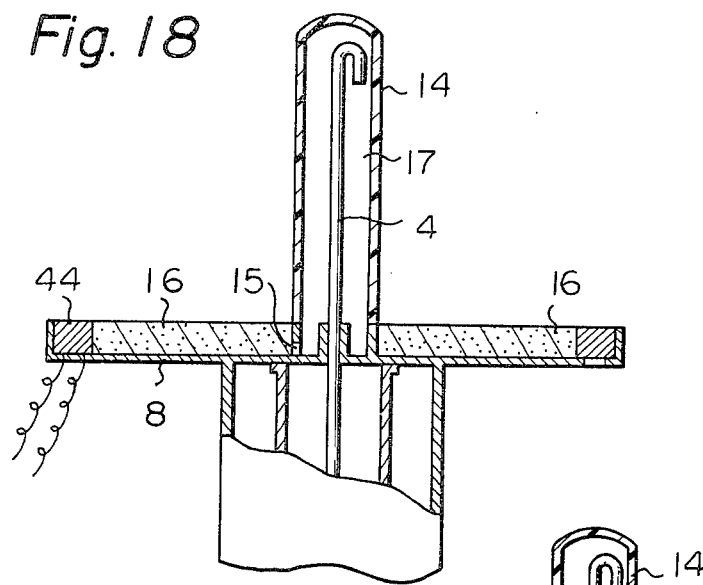
FIGS. 18 to 20 show other embodiments of the evaporative container of the present invention wherein an electric heater or the like is used to accelerate the evaporation of the perfume solution, insecticidal solution, etc.
Figure 19:
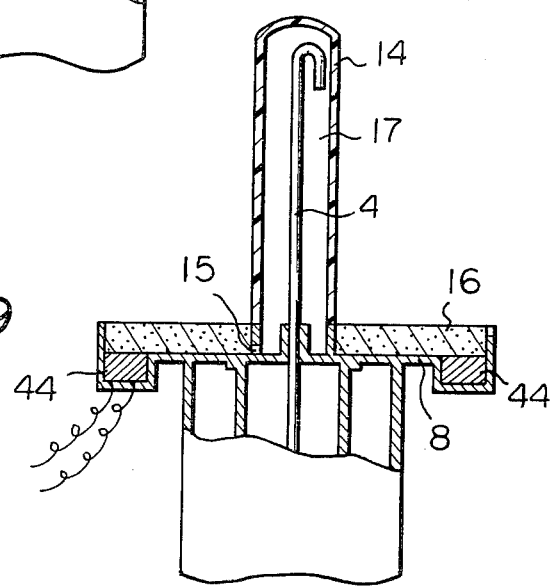
Figure 20:
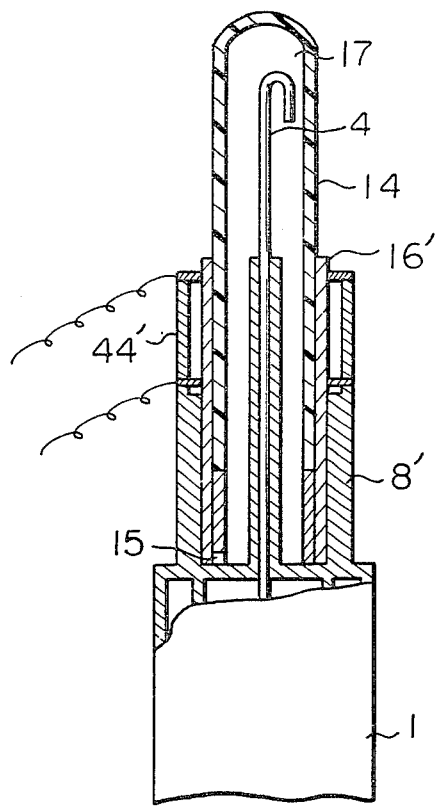

In the embodiments shown in FIGS. 10, 11 and 12, a given length of a cylindrical holder 26 is fitted into the projecting mouth 3 of the container 1. As shown in FIG. 11, the cylindrical holder 26 comprises a cylindrical top 34 and a plurality of straight legs 35. The top end of the holder 26 has an engagement flange 33 which is provided with a notch 27 in a selected portion. The notch 27 may have any cross section. The notch may be replaced by holes made in a cylindrical tube 31 to be described later.

FIG. 12 shows how the cylindrical holder is fitted to the container 1. The maximum length of the holder 26 is such that the lowest ends of the legs 35 contact the bottom of the container 1, and a suitable length may be determined within this range. The cylindrical holder 26 must be positioned in the container in such a manner that the points at which the legs 35 join with the cylindrical top 34 are kept slightly higher than the level of the solution 2 initially charged in the container 1. In other words, the container 1 must first be filled with the solution 2 so that its level does not exceed the points at which the legs join with the cylindrical top 34.

In the arrangement described above, the level of the solution 2 and the legs 35 define openings 30 within the cylindrical holder 26. The same object can be achieved by making a plurality of through-holes in corresponding areas of the lower part of the holder 26. The only requirement is that when the container 1 is first filled with the solution 2, openings 30 should be formed slightly above the liquid level within the holder 26.

As shown in FIG. 10, a given length of a cylindrical packing support axis 32 extends downward from the center of the impregnation member support 8 in such a manner that it has a central through-hole that aligns with the central hole in the support tube 11. The lowest end of the packing support axis 32 is fitted with an annular packing 21 in such a manner that a central through-hole in the packing 21 is aligned for communication with the central through-hole in the support axis 32. The packing 21 is made of rubber, soft synthetic resins, etc. and has an outside diameter equal to the inside diameter of the holder 26. The packing 21 is also fitted with an elastic tube 23 of a suitable length whose throat aligns with the central through-hole in the packing 21 for communication therewith. An inner cylindrical tube 31 extends downward from the center of the impregnation member support 8 in such a manner that it surrounds the packing support axis 32. The inner tube 31 has a diameter and length such that its lowest end contacts the top face of the flange 33 of the holder 26. An outer tube of a given length 20 also extends downward from the support 8, and that tube has an inside diameter slightly larger than the outside diameter of the neck 3′ of the container so that it surrounds the inner tube 31. The object of the present invention is satisfactorily achieved by the embodiment shown in FIGS. 10, 11 and 12, and among other things, if the length of the cylindrical top 34 of the holder 26 is increased, smooth lifting of the solution 2 into the chamber 17 can be accomplished by a single pressing of the container 1 into the outer tube 20 of the impregnation member support 8.

In the embodiments of FIGS. 5 to 12, the solution 2 in the container 1 is lifted by using a packing as a piston, and a notch or small hole is made in either the container or the impregnation member support 8 for establishing communication between the interior of the container and the atmosphere. The same result can also be achieved by providing as an air passage terminating in a small projecting mouth or lip in a selected location of the top of the container. For example in FIG. 8, a tubular projection 10a communicating the atmosphere with the interior of the container is substituted for the passage 10 and slit 24. This projection 10a has a lid 50 that can be opened or closed and which provides hermetic seal for the container. First, the container is filled with solution 2 leaving some space below the lowest level of the throat of the container. By slipping the impregnation member support 8 over the container, a small portion of the solution 2 is lifted toward the upper cylindrical chamber 17. In this stage, the interior of the container is isolated from the atmosphere and is hermetically sealed. Then, the container is held by a hand tightly to give a shove to engage outer tube 20 with neck 3' and cause a substantial amount of the solution 2 to enter the upper cylindrical chamber 17. Immediately thereafter, the lid of the small projecting mouth 10a is loosened or removed to establish communication between the interior of the container and the atmosphere. These procedures let the solution 2 be supplied and evaporated into the atmosphere smoothly and consistently in a later stage.

In the embodiment of FIG. 13, one or more through-holes 36 of a desired shape are made in the tray-shaped impregnation member support 8, and such support achieves significant improvement in evaporation efficiency over a solid support. To prove this, the present inventors made two evaporative containers each comprising a disc of impregnation member having a central through-hole which is placed on a support 8 with a low surrounding wall in such a manner that the disc closes a small through-hole 15 made in the bottom of the cylindrical member 13 that extends upward from the center. In one evaporative container, only the top side of the impregnation member was open to the atmosphere (i.e. that member was solid and had no holes in it), whereas, in the other container, not only the top side but also about a quarter of the bottom side was open to the atmosphere (i.e. the member had holes that accounted for about a quarter of its area). When an aqueous perfume solution was evaporated from these two containers, the one using the perforated impregnation member was about twice as effective in evaporation as the one using the solid impregnation member. The amount of evaporation can be controlled depending upon the object and location of use by varying the number and size of the holes.

In the embodiment of FIG. 14, a cylindrical impregnation member 16' is fitted around the lower part of the cylindrical member 14, and a cylindrical tubular support 8' is formed around the lower part of the impregnation member 16' to hold it in position. The advantages of this embodiment are: the impregnation member 16' is fairly easy to fit in the support 8'; the small hole or slit 15 in the cylindrical upper tubular member 13 extending upward from the center of the support 8 can be easily closed by fitting the impregnation member 16' in the support 8'; and the impregnation member 16' will not be easily dislodged when the container falls down.

In the embodiment of FIG. 15, the impregnation member 16' is surrounded by a cylindrical tubular support 8' having a soft peripheral wall which has a groove 38 in its outer periphery. An evaporation control ring 37 is fitted around the peripheral wall of support 8', wall 8' and the inner wall of the lower part of the ring 37 is provided with projection 39 that engages the groove 38 in the peripheral wall. Maximum evaporation of the solution 2 is achieved when the projection 39 is brought into engagement with the groove 38. If the evaporation control ring 37 is slid downward against the peripheral wall of the support 8', the wall is clamped by the projection 39, and as a result, the diffusion of the solution 2 into the exposed area of the impregnation member 16' is suppressed. Smoother and more effective control of the amount of evaporation can be achieved by providing the outer periphery of the peripheral wall of the support 8' with a taper that decreases from bottom to top.

The specific object, location and season of the use of the evaporative container according to the present invention may require a very precise control of evaporation. This requirement can be most effectively met by using an evaporation control lid as indicated by 40 in FIG. 16. The lid has a surface area corresponding to that of the impregnation member 16 and is slidably mounted on the cylindrical member 14. The amount of the solution 2 to be evaporated can be controlled by vertical movement of the lid 40.

In the embodiment of FIG. 17, the impregnation member support 8*e* includes a fairly high surrounding wall which is provided with a desired number of openings 41 in selected locations. The wall surrounding the evaporation control lid 40 is also provided with a desired number of openings 42 of a given shape in selected locations. The top of the lid 40 may also be provided with openings 43 having a suitable area. According to this arrangement, the amount of evaporation of the solution absorbed by the impregnation member 16 can be freely controlled by rotating the lid 40 about the support 8*e*. The opening 43 in the top of the lid 40 permits the solution 2 to be evaporated at a constant rate, and additional control can be provided by rotating the lid 40 if more solution need be evaporated for some reason, say, the container must be used in a large room.

The embodiments shown in FIGS. 1 to 17 relate to a container for evaporating the solution 2 at room temperature. A container equipped with an electric heater or other heating means to accelerate the evaporation of the solution 2 absorbed and developed by the impregnation member is now illustrated in FIGS. 18 to 20.

In FIG. 18, the periphery of the impregnation member support 8 is fixedly provided with an electric heater 44 comprising an insulated resistor in the form of, say, wire, sheet or coil that is confined in a pipe made of a good heat conductor such as metal. The heater contacts the periphery of the member 16, and if necessary, a bimetal or other thermostat may be used with the heater. By impressing current through the resistor, heat is generated to evaporate the solution 2 in an increased amount.

FIG. 19 shows a modification of FIG. 18 wherein the impregnation member 16 is used in a horizontal state. The underside of the impregnation member support 8 is provided with an annular hollow projection on its periphery, and in the hollow space of that projection, a heater 44 is fixedly positioned to heat the periphery of the impregnation member from below. The embodiment of FIG. 19 achieves a very high evaporation efficiency with heat.

FIG. 20 shows a modification of an evaporation container using a cylindrical impregnation member 16', wherein a cylindrical heater 44' is spaced around the exposed upper portion of the member 16'.

The above embodiments having an electric heater incorporated therein are suitable for use when the concentration of the solution 2 in the atmosphere of a site where it is used must be increased as soon as the solution is evaporated, namely, a large volume of the solution must be evaporated within a short time. Once the desired concentration has been reached, the user can select a normal evaporation mode (i.e. evaporation at room temperature), as required, by simply turning off the heater.

FIG. 21 shows a typical example of the evaporative container of the present invention as it is put on the market before reaching the consumer. As shown, the container is filled with solution 2 and sealed with a threaded stopper 46. The user first unscrews the stopper and slowly pushes the impregnation member support 8 into the container 1 while cacuum-breaking passage 10*b* is blocked, either by placing a finger over the passage, or by sealing it with a lid, as described supra. The solution 2 rises in the feed tube 4, flows into chamber 17, and soon evaporates in the manner described in the foregoing. In the figure, the numeral 45 indicates a ring for holding the cylindrical member 14 in position. The member 14 is fitted over the tubular member 13 extending upward from the center of the support 8. The numeral 47 indicates a water-absorbing fibrous material that is separate from the impregnation member 16 and which is inserted in the slit 15 and communicates solution in the chamber 17 to the impregnation member 16.

The evaporative container of the present invention can be used for various purposes. It can be used as a deodorizing perfume container if a perfume solution containing various perfume components is selected as the contents. It can also be used as an insecticide evaporating container, repellent evaporating container, bactericide evaporating container, and mold inhibitor evaporating container if the contents are solutions of an insecticide, repellent, bactericide and mold inhibitor, respectively. It can even be used as a multipurpose evaporative container if the contents is a mixture of these materials. Therefore, the evaporative container of the present invention can be used for various purposes depending on the type of solution to be applied.

The advantages of the present invention are now described by reference to the following experimental data.

Experiment

A brown container (dia. 82 mm, ht. 74 mm, capacity 150 cc) was filled with 100 cc of a sample solution having the formulation indicated below. A wick made of a bundle of polymeric fibers that was 14 mm in diameter and 73 mm high was erected within the container. The lower part of the wick was immersed in the sample solution and the upper part was exposed from the liquid level. This container was used as a prior art product. An evaporative container of the type shown in FIG. 1 and having the same capacity as that of the prior art product was filled with 100 cc of the same sample solution. The resulting container was used as an example of the present invention.

Formulation of the sample solution

| | |
|---|---|
| Perfume preparation (Lemon floral 6E-4292B from Ogawa Flavor Co., Ltd. in Japan) | 3% |
| Solubilizing agent | 3% |
| Ethanol | 5% |
| Water | 89% |
| Total | 100% |

When each sample solution was put in the container, its composition was checked by gas chromatography. When the volume of each sample solution was reduced to about a third of the initial volume as a result of evaporation, its composition was again checked by gas chromatography.

Figure 22:
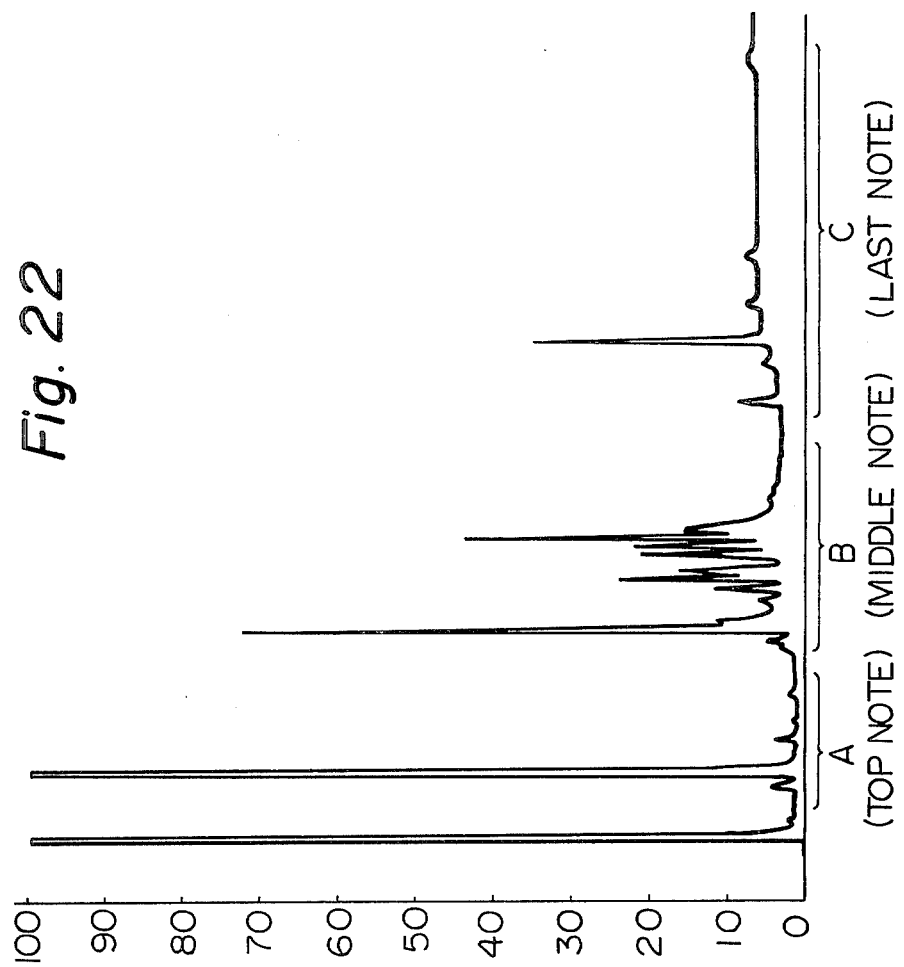
FIGS. 22 and 23 show charts obtained by chromatography which reflect the composition of the sample solution as prepared in Experiment before evaporation and at the time the volume was reduced to about a third of the initial value due to evaporation using a container according to the present invention, respectively; and, FIGS. 24 and 25 show charts obtained by chromatography which reflect the composition of the sample solution as prepared in Experiment before evaporation and at the time the volume of the solution was reduced to about a third of the initial value due to evaporation using a container according to the prior art, respectively.
Figure 23:
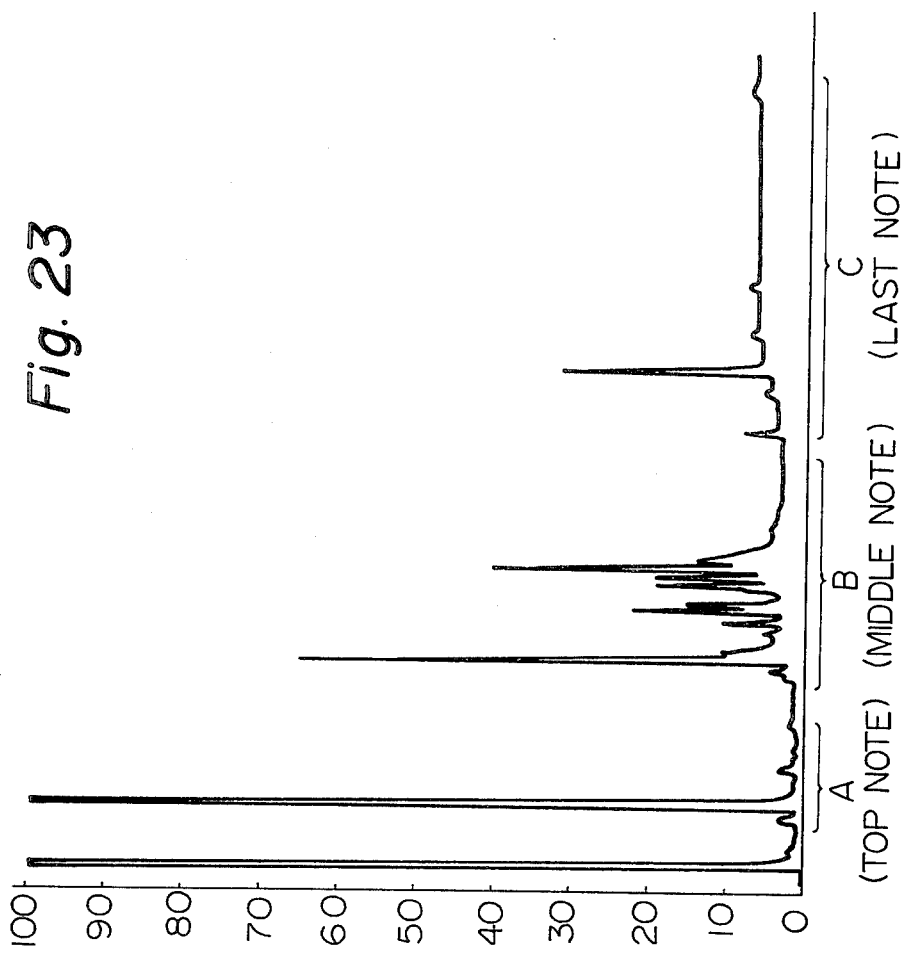
Figure 24:
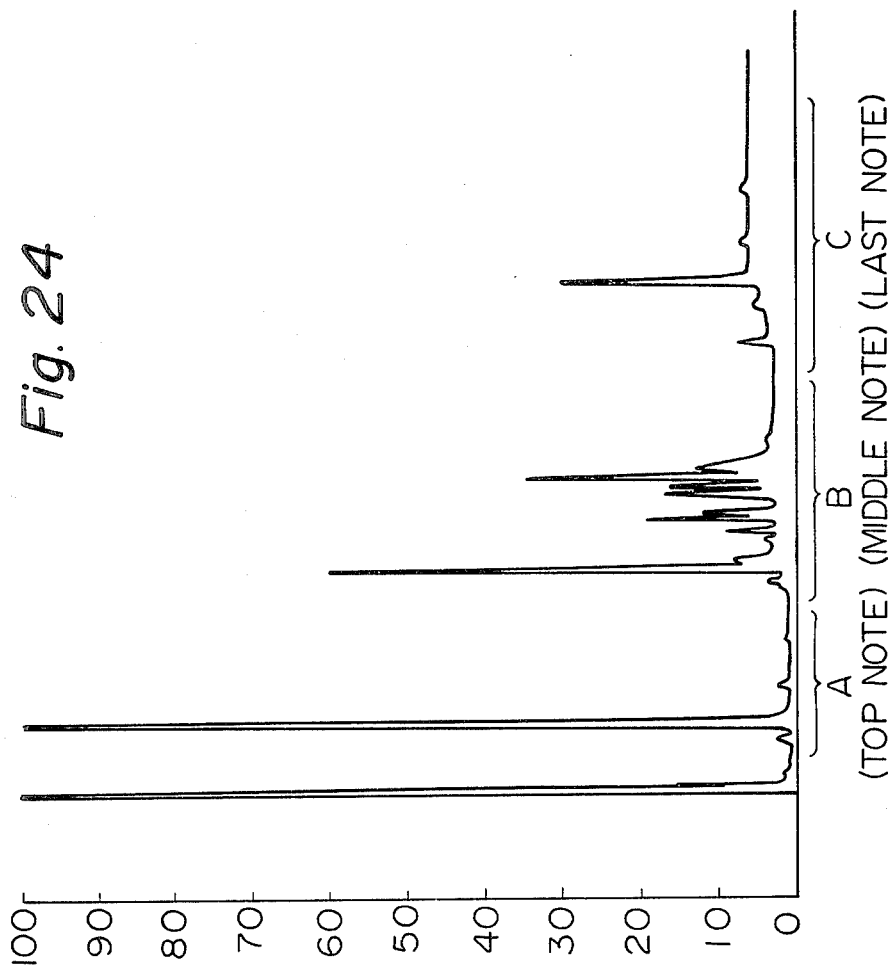
Figure 25:
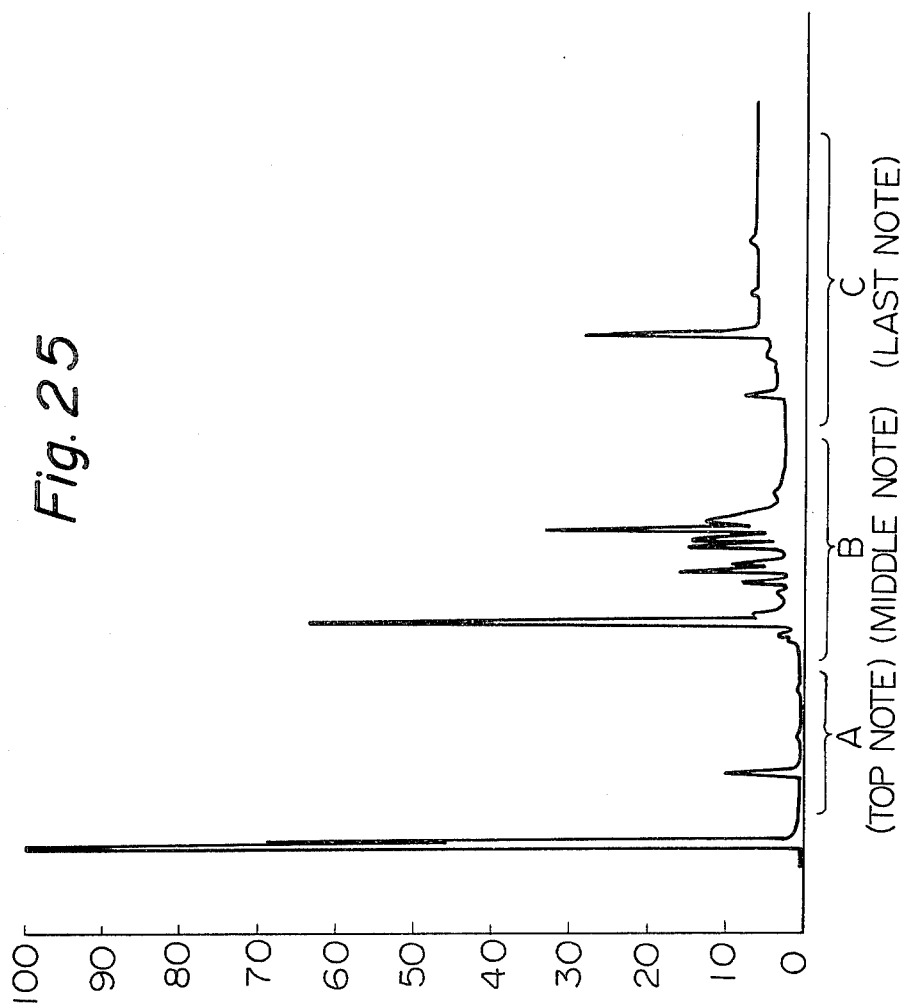

As is evidenced by the charts shown in FIGS. 24 and 25, in the sample solution put in the prior art container, the ethanol content was reduced significantly, and there was no top note left. The remaining sample solution had a too irritating smell which may well be described as a malodor rather than fragrance. On the other hand, as is demonstrated by the charts shown in FIGS. 22 and 23, a great change in the composition of the perfume preparation did not take place after evaporation, and the remaining solution retained a "flowery", mellow and pleasant smell when the container according to the present invention was used.

As described in the foregoing, the present invention depends on the mechanism of a siphon to keep supplying a fresh solution from the container to the impregnation member through a feed pipe immersed in the container. This accomplishes consistent supply of a solution having an invariable composition, and there is no possibility of the proportions of the volatile components to vary with time. To supply the solution to cylindrical member 17 from containers using no piston, the user simply attaches the impregnation member support 8 to the container and presses cylindrical tubular member 14 with fingers. If the container has a piston, the user may simply attach the support 8 to the container. Then, the solution is automatically supplied to the chamber 17, absorbed by the impregnation member 16 and evaporated from it. Therefore, the evaporative container of the present invention is very simple to use and is free from the chance of fouling the hand by the solution. If no evaporation is necessary, the user may simply remove the impregnation member support 8 from the container and stopper the mouth of the container.

What is claimed is:

1. An evaporative apparatus for evaporating a solution in constant proportion of the solution ingredients comprising:
   (a) a container for said solution having a body portion with an upwardly-extending central neck portion;
   (b) support means for supporting an impregnation member comprising an impregnation member supporting plate sealingly mountable on the neck portion of the container to form a first enclosed space within the body of the container;
   (c) a closed cylindrical tubular member vertically extending from said supporting plate and defining a second enclosed space therewith;
   (d) an impregnation member of a liquid-absorbing material for impregnation with solution to be evaporated disposed around said cylindrical tubular member;
   (e) a capillary feed tube vertically extending from the bottom of the body portion of the container into the second enclosed space through a central bore in said supporting plate for delivering solution in the container to the second enclosed space;
   (f) actuating means for initiating flow of solution through said feed tube into said second enclosed space by establishing a pressure differential between said enclosed spaces;
   (g) vacuum-breaking passage means for communicating the atmosphere with the first enclosed space after initiation of solution flow to maintain solution in the container at atmospheric pressure during evaporative operation of the apparatus; and
   (h) communication means for communicating solution from said second enclosed space to said impregnation member while maintaining the second enclosed space at a pressure sufficiently reduced below atmospheric pressure to maintain flow of solution through the tube during evaporative operation of the apparatus.

2. An apparatus according to claim 1, wherein the cylindrical tubular member is made of a hard material and a detachable and hermetically sealable cap closes the upper end thereof.

3. An apparatus according to claim 1, wherein said vacuum-breaking passage means consists of a small air passage having an easily detachable and completely sealable lid for closing the passage during initiation of flow for solution.

4. An apparatus according to claim 1, wherein the impregnation member supporting plate defines one or more through-holes.

5. An apparatus according to claim 1, wherein the cylindrical tubular member defines one or more holes or slits and extends upward from the center of the impregnation member supporting plate, a cylindrical impregnation member is fitted over the lower part of the cylindrical tubular member and is fixedly attached to said cylindrical tubular member, a cylindrical holding wall is provided on said impregnation member supporting plate to hold the lower part of said cylindrical impregnation member in position, and a cylindrical electric heater is positioned on said impregnation member holding wall, the apparatus further including a thermostat.

6. The apparatus of claim 1, wherein said communication means comprises at least one aperture defined by the wall of the base portion of the tubular member surrounded by the impregnation member.

7. The apparatus of claim 1, wherein said communication means comprises a slit in the base of said tubular member and a water-absorbing fibrous bundle disposed in said slit for communicating solution from said second enclosed space to the impregnation member.

8. An apparatus according to claim 1, wherein the impregnation member supporting plate is positioned horizontally and an electric heater is disposed adjacent the impregnation member.

9. The apparatus of claim 8, wherein the heater is positioned in the hollow space of an annular projection formed around the supporting plate.

10. The apparatus of claim 1, wherein the actuating means for initiating solution flow comprises vacuum-forming means for applying a vacuum to the portion of the feed tube within the enclosed space.

11. An apparatus according to claim 10, wherein the cylindrical tubular member is made of a hard material and the vacuum-forming means comprises an elastic bulb closing the upper end thereof.

12. The apparatus of claim 10, wherein the vacuum-forming means comprises a deformable cylindrical tubular member.

13. An apparatus according to claim 12, wherein the cylindrical tubular member is made of a soft elastic material and the upper part thereof is pleated.

14. An apparatus according to claim 1, wherein the impregnation member supporting plate includes a surrounding wall to hold the impregnation member in position.

15. An apparatus according to claim 14, wherein the surrounding wall is made of a soft elastic material and is fitted around its periphery with an evaporation control ring of a hard material vertically adjustable to control the amount of evaporation.

16. An apparatus according to claim 14, further including an evaporation control lid for controlling evaporation from the impregnation member, slidably mounted on the cylindrical tubular member to control evaporation by vertical movement of said lid onto and away from the impregnation member supporting plate.

17. An apparatus according to claim 16, wherein the surrounding wall of the impregnation member supporting plates defines a number of openings in selected locations, and the periphery of the control lid also defines a corresponding number of openings having the same shape as the openings in the surrounding wall of the impregnation member support plate, the area of the openings being controllable by rotating the lid about the supporting plate.

18. The apparatus of claim 1, wherein said actuating means comprises an annular packing detachably fitted around a lower portion of the feed tube so that during initial mounting of the supporting plate and associated feed tube the packing functions as a piston and the neck of the container functions as a sleeve for the piston to increase pressure on the solution within the container and initiate flow of the solution within the feed tube, said vacuum-breaking passage being temporarily blocked during initial mounting and initiation of solution flow, and unblocked after completion of mounting for evaporative operation.

19. The apparatus of claim 18, wherein the vacuum-breaking passage comprises a passage defined by the wall of the body portion of the container, said passage including a projecting lip and a lid removably sealingly engageable therewith for blocking the passage during initiation of solution flow and for unblocking the passage for evaporative operation.

20. The apparatus of claim 18, wherein said vacuum-breaking passage means comprises an aperture defined by the neck wall of the container blockable by movement of the packing through the neck.

21. The apparatus of claim 20, wherein the vacuum-breaking passage is reestablished for evaporative operation by displacement of the packing below the neck portion of the container at the completion of mounting.

22. The apparatus of claim 20, wherein the packing includes a notch on the outer periphery thereof, and the vacuum-breaking passage is reestablished for evaporative operation by displacement of the packing within the neck of the container so that the notch communicates the neck portion of the container and its vacuum-breaking passage with the body portion of the container at the completion of mounting.

* * * * *